United States Patent [19]

Kiuchi

[11] 4,181,012

[45] Jan. 1, 1980

[54] DEVICE FOR CONVERTING MECHANICAL QUANTITIES INTO ELECTRICAL QUANTITIES

[75] Inventor: Mitsuhiro Kiuchi, Tokyo, Japan

[73] Assignee: Kabushiki Kaisha Nagano Keiki Seisakusho, Tokyo, Japan

[21] Appl. No.: 937,892

[22] Filed: Aug. 29, 1978

[30] Foreign Application Priority Data

Aug. 31, 1977 [JP] Japan ............................ 52-104487

[51] Int. Cl.$^2$ ........................................... G01L 5/00
[52] U.S. Cl. ............................................. 73/141 A
[58] Field of Search .................. 73/141 A, 849, 852, 73/775, 726, 727

[56] References Cited

U.S. PATENT DOCUMENTS

| 2,112,252 | 3/1938 | Sang | 73/141 A |
|---|---|---|---|
| 3,266,303 | 8/1966 | Pfann | 73/141 A |
| 3,754,438 | 8/1973 | Matson | 73/141 A |

Primary Examiner—Jerry W. Myracle
Attorney, Agent, or Firm—Beveridge, DeGrandi, Kline & Lunsford

[57] ABSTRACT

Two resistance strain gages are secured to a cantilever beam at each of two parts thereof near its fixed end of lower rigidity than the other parts of the beam and are connected to constitute opposed arms of an electrical bridge, the free end of the beam being further supported in a manner permitting longitudinal displacement but prohibiting transverse displacement of the beam, and a mechanical quantity in the form of a mechanical force is applied to a selectively variable point on the beam, whereby the mechanical quantity is converted into a corresponding electrical quantity as the output of the bridge.

6 Claims, 7 Drawing Figures

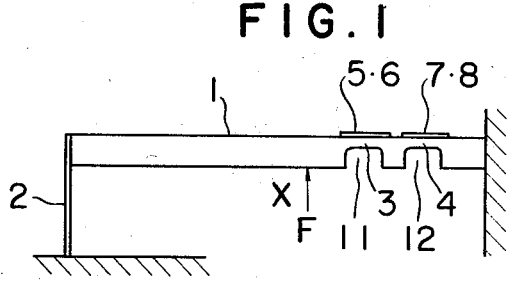
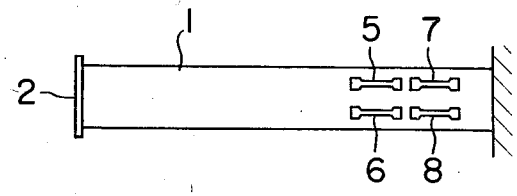
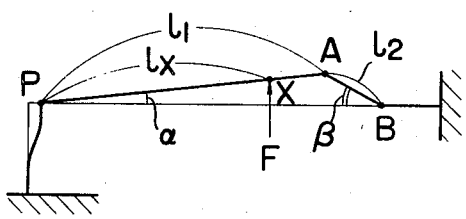
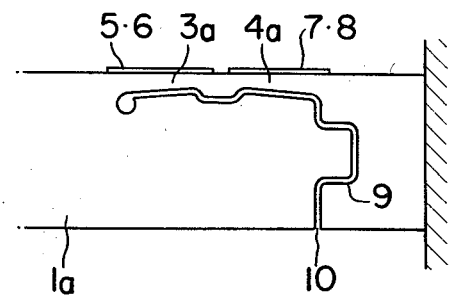
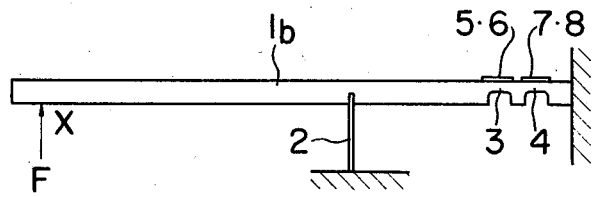
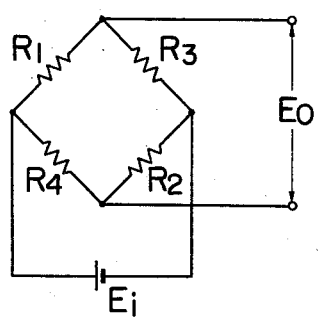
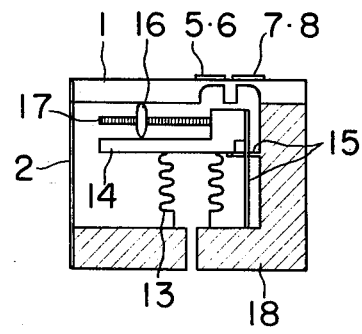

DEVICE FOR CONVERTING MECHANICAL QUANTITIES INTO ELECTRICAL QUANTITIES

BACKGROUND OF THE INVENTION

This invention relates generally to transducers or devices for converting mechanical quantities into electrical quantities or signals and more particularly to a device of this character comprising essentially a strain-exhibiting element for indicating mechanical force as strain quantity and resistance strain gages for converting this strain quantity into electrical quantity.

For the strain-exhibiting element which undergoes a strain in response to a mechanical force applied thereto (hereinafter referred to as a "strain element") in a device of the instant character known heretofore, a material of high elasticity has been required, and for this purpose expensive materials and, at times, materials which are very difficult to work have been used. However, by simplifying the shapes and, at the same time, miniaturizing the sizes of these elements, materials of excellent characteristics can be easily used. Furthermore, by mounting all of the necessary strain gages on one surface of the strain element, the fabrication work thereof is facilitated, and stabilization of the performance of the elements can be attained. In addition, it becomes possible to apply techniques such as evaporation deposition and electro-etching, and further advantages such as miniaturization of the strain element, improvement of its characteristics, and lowering of its price are afforded.

One the one hand, for attaining high accuracy, it is desirable to use a minimum of four resistance strain gages connected in combination in the form of an electrical bridge wherein there are pairs of gages, each pair comprising a gage for measuring tensile strain and a gage for measuring compressive strain.

Among the strain elements for which beams are used, there is one of cantilever-beam type. When a strain element of this cantilever-beam type is adapted to produce tensile strain and compressive strain simultaneously on one outer surface of the beam, the quantity of strain of the strain-exhibiting parts (hereinafter referred to as the "strain parts") cannot be varied by changing the point of application of mechanical force, and the performance of the element is disadvantageously determined by the width and thickness of the beam or the spacing of the strain parts. In the case of an element using a beam with fixed ends, it is difficult to change the position of application of force, and the construction becomes complicated. Moreover, the stresses are not simple, whereby an element of this type is not suitable for use with resistance gages. Thus, among the devices known heretofore wherein beams are used, there has been no device of simple form satisfying the requirements of both performance and construction.

SUMMARY OF THE INVENTION

It is an object of this invention to provide a device for converting mechanical quantities into electrical quantities of simple construction, low production cost and high performance.

Another object is to provide a device of the above stated character in which a cantilever beam is used as the strain element and has two strain parts of less rigidity than the other parts of the beam, and two resistance strain gages are secured to the same surface of the beam at each of the two strain parts, which are relatively close to each other.

Still another object of the invention is to provide a device of the above stated character in which a mechanical quantity in the form of a force is applied to the cantilever beam at a point thereof which can be varied over a wide range to vary the quantity of strain resulting from the application of the force.

According to this invention, briefly summarized, there is provided a device for converting mechanical quantities into electrical quantities or signals comprising a strain-exhibiting element, resistance strain gages secured to the strain-exhibiting element, means for applying a mechanical quantity in the form of a mechanical force to the strain-exhibiting element, and means including the strain gages and producing an electrical quantity in response to and corresponding to the force and characterized in that: the strain-exhibiting element is a cantilever bar having near the fixed end thereof two strain-exhibiting parts possessing amply lower rigidity than the other parts of the bar and being spaced apart but close to each other in tandem alinement in the longitudinal direction of the bar, the bar being further supported at a point thereof remote from said strain-exhibiting parts and fixed end in a manner permitting the bar at said point to undergo displacement in the longitudinal direction thereof but prohibiting the same from being displaced in a direction parallel to that of said force; the strain gages are respectively secured to the bar on the same surface thereof at said strain-exhibiting parts; and means are provided to vary the point on the bar at which the force is applied.

The nature, utility, and further features of this invention will be more clearly apparent from the following detailed description with respect to preferred embodiments of the invention when read in conjunction with the accompanying drawing, which is briefly described below, and throughout which like parts are designated by like reference numbers.

BRIEF DESCRIPTION OF THE DRAWINGS

In the drawing:

FIGS. 1 and 2 are respectively diagrammatic side and plan views showing one mode of practice of the device according to this invention;

FIG. 3 is a line diagram indicating a state of operation of the device illustrated in FIGS. 1 and 2;

FIG. 4 is a fragmentary side view showing another embodiment of the invention wherein a strain-exhibiting bar is provided with a slot by electric-discharge machining;

FIG. 5 is a diagrammatic side view showing still another embodiment of the invention;

FIG. 6 is a circuit diagram of one example of bridge circuit suitable for use in the device of the invention; and FIG. 7 is diagrammatic side view showing an example of application of the device of the invention to converting pressure to electric quantity.

DETAILED DESCRIPTION OF THE INVENTION

Referring first to FIGS. 1 and 2, the strain-exhibiting bar 1 (hereinafter referred to as a "strain bar") shown therein is a cantilever beam with one fixed end and has a simple shape, for example, of a rectangular cross section. The free end of this strain bar 1 is supported by a leaf spring 2 secured thereto and extending perpendicularly to the strain bar 1 and is thereby immovable in the direction perpendicular to the strain bar but is free to undergo displacement in the longitudinal direction of the strain bar. The strain bar 1 is provided near its fixed end with two strain parts 3 and 4 disposed side by side in positions which are mutually spaced apart in the longitudinal direction of the strain bar 1. These strain parts 3 and 4 have amply less rigidity than the other parts of the bar. For example, channel-like grooves 11 and 12 with rounded inner corners are formed in the transverse direction in one face of the strain bar 1, and the parts of the bar 1 of reduced cross-sectional area thus left are used as the strain parts 3 and 4. The purpose here in reducing the cross-sectional area at the strain parts 3 and 4 is to reduce the section moduli at these parts and thereby to reduce the rigidity of these parts relative to that of the rest of the strain bar 1.

At the strain parts 3 and 4, pairs of resistance strain gages 5, 6 and 7, 8 are mounted by a known method on the same surface of the strain bar 1. These four resistance strain gages 5, 6, 7, and 8 are electrically connected to form a bridge.

The above-mentioned leaf spring 2 has a cross-sectional area which is ample for resisting a force (as described hereinafter) applied to the strain bar 1 and is adapted to have amply less rigidity than the strain parts 3 and 4 with respect to bending moments. Instead of this leaf spring 2, a support means depending on sliding or rolling contact due to a knife edge or a shaft may be used. Furthermore, the resistance strain gages 5, 6, 7, and 8 may be of the diffusion type or of the evaporation deposition type.

The direction in which a force is applied to the strain bar 1 is perpendicular to the surface on which the strain gages are mounted. As is indicated in FIG. 3, when a force F is applied to the strain bar 1 as shown, the strain parts 3 and 4 undergo deflection in mutually opposite directions since the strain bar 1 is rigidly fixed at one end thereof and is supported at the other end as described above, and tensile and compressive strains are produced in the resistance strain gages. More specifically, a tensile strain proportional to the force F is applied to the resistance strain gages 5 and 6 installed at the strain part 3, while a compressive strain similarly proportional to the force F is applied to the resistance strain gages 7 and 8 installed at the strain part 4. Since these four resistance strain gages 5, 6, 7, and 8 are appropriately connected to form an electrical bridge wherein the gages 5 and 6 are in opposition to the gages 7 and 8, the strain quantity can be detected as an electrical quantity.

One example of an electrical bridge suitable for use in the device of this invention is shown in FIG. 6, in which the resistances $R_1$, $R_2$, $R_3$, and $R_4$ represent the resistances of the resistance strain gages 5, 6, 7, and 8, respectively. The impressed voltage of the bridge is $E_i$. The resistance strain gages thus connected constitute a full bridge, and an output $E_o$ proportional to the strain quantity can thus be obtained.

In FIG. 3, the center points of the strain parts 3 and 4 are respectively designated by A and B, the support point of the leaf spring 2 by P, the point of application of the force F by X, the distance $\overline{PX}$ by $l_x$, the distance $\overline{PA}$ by $l_1$, and the distance $\overline{AB}$ by $l_2$. Then, a bending moment close to $l_2 l_x F/2l_1$ acts at the strain parts 3 and 4, and a strain proportional to this moment is produced at the strain parts 3 and 4. If the point X of application of the force F changes, the distance $l_x$ will vary, and the strain quantity will change. When the device is so designed that $l_1 >> l_2$, the strain quantities at the strain parts 3 and 4 are substantially equal. Furthermore, the deflection angle $\alpha$ becomes small.

For example, when the device is so designed that $l_1/l_2=4$, the ratio of strain quantities becomes 1.25/1, and the nonlinearity due to the fact that the resistance variations of the resistance strain gages are not equal in the four arms becomes 0.03, which is negligible. Furthermore, the deflection angle $\alpha$ of the part $\overline{PA}$ of the strain bar 1 due to the application of the force thereto at this time is $\frac{1}{4}$ of the deflection angle $\beta$ of the part $\overline{AB}$, and the effect of the bending moment acting on an input shaft for applying the force on the point X decreases to a negligible degree. Accordingly, the source for generating the mechanical quantity and the strain bar can be coupled without any difficulty.

Thus, the device of this invention comprises a strain bar in the form of a cantilever beam supported at its free end and having near its fixed end two strain parts in closely spaced positions and resistance strain gages mounted on a common surface of each of the strain parts, whereby tensile and compressive strains are simultaneously produced, and the quantities of these strains can be accurately detected by combining the resistance strain gages in the form of an electrical bridge. In this case, since the resistance strain gages are mutually close together, the temperature characteristic is good. Moreover, since the strain gages subjected to tensile and compressive strains are combined in a bridge, the temperature characteristic is excellent, and a high output can be obtained.

Another feature of the device of this invention is that, since resistance strain gages are mounted in mutually close proximity on one surface of the strain bar, the work of mounting these strain gages is facilitated, and the device can be readily fabricated. Accordingly, a transducer element of excellent characteristics is afforded at low price. This is particularly pronounced in the case of gages of the diffusion type or the evaporation deposition type. Still another feature of the device of this invention is that the position of application of the force can be selected in a wide range on the strain bar. As a result, the strain quantities of the strain parts can be increased or decreased, whereby span variation or span adjustment is possible, which is highly useful for simplification of construction and reduction of production cost.

A modification of the strain parts formed by electric-discharge machining (known also as electric-spark or electro-erosion machining) in which a wire is used is shown in FIG. 4. The strain parts 3a and 4a in the bar 1a of this modification are formed by a slot 10 cut by electric-discharge machining. The shapes and thicknesses of these strain parts are so adjusted that the stress distribution will be uniform with respect to the effective parts (i.e., middle parts of narrow width and high resistance) of the resistance strain gages and that the rigidity of the electrode parts (i.e., parts made wide, for example, thereby to lower their resistances for the purpose of connecting lead wires to the opposite ends thereof) will be high so that the strain will be small. This is the same as in the case illustrated in FIGS. 1 and 2, but in the case shown in FIG. 4, there is an additional advantage in that a suppression part 9 for suppressing excessive strain can be integrally formed by electric-discharge machining. While a number of other suppression techniques and means such as the outward extension of the strain bar 1 can be devised, it is a feature of this embodiment of the invention that this suppression can be achieved by a miniature and simple form of this character. In this case also, the bar 1a at the strain parts 3a and 4a is made less rigid than the other parts thereof by reducing the section moduli at these parts.

In still another embodiment of this invention as illustrated in FIG. 5, the free end of the strain bar 1b extends further outward beyond the support point, and the force F is applied to this extended part. This arrangement is useful for converting small forces into electrical quantities since the distance $\overline{PX}$ in FIG. 3 can be set at a value greater than the distance $\overline{PA}$.

An example of application of this invention to the measurement of pressure is illustrated in FIG. 7. The device in this case has a base structure 18, to which the open, pressure-receiving end of a bellows 13 is fixed. To the other end of the bellows 13 is fixed a beam 14 of plate form parallel to a strain bar 1. This beam 14 at one end thereof is secured to the base 18 by leaf springs 15 in mutually crossed disposition. Force is transmitted from the beam 14 to the strain bar 1 by way of a nut 16 screw-engaged with a threaded shaft 17 fixed at its one end to a part of the beam 14.

Thus, the position of the nut 16 contacting the strain bar 1, that is, the point on the strain bar 1 at which the force from the beam 14 due to the pressure acting in the bellows 13 is applied can be varied by turning the nut 16 relative to the threaded shaft 17. Thus, the ratio between the force produced by the bellows 13 due to the pressure and the force to which the strain parts are subjected can be varied. Accordingly, by setting the nut 16 at an appropriate position, the pressure sensed by the bellows 13 is indicated by the output $E_o$ of the bridge whose arms are constituted by the resistance strain gages 5, 6, 7, and 8.

What is claimed is:

1. In a device for converting mechanical quantities into electrical quantities of the class having a strain-exhibiting element, resistance strain gages secured to the strain-exhibiting element, means for applying a mechanical quantity in the form of a mechanical force to the strain-exhibiting element, and means including said strain gages and producing an electrical quantity in response to and corresponding to said force, the improvement wherein: the strain-exhibiting element is a cantilever bar having near the fixed end thereof two strain-exhibiting parts possessing amply lower rigidity than the other parts of the bar and being spaced apart but close to each other in tandem alignment in the longitudinal direction of the bar, the bar being further supported at a point thereof remote from said strain-exhibiting parts and fixed end in a manner permitting the bar at said point to undergo displacement in the longitudinal direction thereof but prohibiting the same from being displaced in a direction parallel to that of said force; the strain gages are respectively secured to the bar on the same surface thereof at said strain-exhibiting parts; and means are provided to vary the point on the bar at which the force is applied.

2. A device as claimed in claim 1 in which said resistance strain gages comprise first and second strain gages secured to said bar at one of said strain-exhibiting parts with spaced-apart disposition parallel to the bar longitudinal direction and third and fourth strain gages similarly secured to the bar at the other strain-exhibiting part, and said strain gages are connected to form an electrical bridge provided with a power source wherein the first and second strain gages constitute opposed arms and the third and fourth strain gages constitute other opposed arms, said electrical bridge constituting a part of said means for producing an electrical output in response and corresponding to said force.

3. A device as claimed in claim 1 in which said strain-exhibiting parts are caused to have said amply lower rigidity by reducing the section moduli of said bar at said parts.

4. A device as claimed in claim 3 in which said section moduli are reduced by cutting out portions of the bar at said strain-exhibiting parts.

5. A device as claimed in claim 1 in which said point of further support of said bar is at the extreme free end of the bar, and said force is applied to the bar at a point thereof intermediate between the strain-exhibiting parts and said extreme free end.

6. A device as claimed in claim 1 in which said point of further support of said bar is intermediate between the free end and the strain-exhibiting parts of the bar, and said force is applied to the bar at a point near the free end.

* * * * *